United States Patent
Gu et al.

(10) Patent No.: US 10,893,565 B2
(45) Date of Patent: Jan. 12, 2021

(54) METHOD FOR REPORTING BEAM RECEPTION FAILURE, USER EQUIPMENT, MEDIUM AND SYSTEM

(71) Applicant: SPREADTRUM COMMUNICATIONS (SHANGHAI) CO., LTD., Shanghai (CN)

(72) Inventors: Xiangxin Gu, Shanghai (CN); Yun Deng, Shanghai (CN)

(73) Assignee: SPREADTRUM COMMUNICATIONS (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 16/480,846

(22) PCT Filed: Dec. 27, 2018

(86) PCT No.: PCT/CN2018/124138
§ 371 (c)(1),
(2) Date: Jul. 25, 2019

(87) PCT Pub. No.: WO2019/137223
PCT Pub. Date: Jul. 18, 2019

(65) Prior Publication Data
US 2020/0344833 A1    Oct. 29, 2020

(30) Foreign Application Priority Data
Jan. 10, 2018    (CN) .......................... 2018 1 0024551

(51) Int. Cl.
*H04W 72/00* (2009.01)
*H04W 76/19* (2018.01)
(Continued)

(52) U.S. Cl.
CPC ........... *H04W 76/19* (2018.02); *H04W 16/28* (2013.01); *H04W 72/046* (2013.01)

(58) Field of Classification Search
CPC .... H04W 76/19; H04W 72/046; H04W 16/28
See application file for complete search history.

(56) References Cited

U.S. PATENT DOCUMENTS

| 2012/0218904 A1 | 8/2012 | Narasimha et al. |
| 2013/0215947 A1* | 8/2013 | Yao ...................... H04B 7/0617 375/224 |
| 2017/0331670 A1* | 11/2017 | Parkvall ............ H04W 52/0229 |

FOREIGN PATENT DOCUMENTS

| CN | 102647800 A | 8/2012 |
| WO | 2012024338 A | 2/2012 |

OTHER PUBLICATIONS

3GPP TSG RAN meeting #76, RP-171505, Jun. 2017.*
(Continued)

*Primary Examiner* — Lakeram Jangbahadur
(74) *Attorney, Agent, or Firm* — Cantor Colburn LLP

(57) ABSTRACT

A method for reporting a beam reception failure, a user equipment and a system, wherein the method includes: obtaining an identifier of a secondary cell where a beam reception fails; selecting another beam as a candidate beam in the secondary cell where the beam reception fails; and encapsulating the identifier of the secondary cell where the beam reception fails and an identifier of the candidate beam into a Media Access Control (MAC) control element, and transmitting the MAC control element out using resource of other cells, wherein the other cells comprise: a primary cell, a primary secondary cell, or other secondary cells where the beam reception fails. Therefore, the identifier of the secondary cell where the beam reception fails and its corresponding candidate beam could be transmitted without using the PRACH and the PUCCH.

10 Claims, 4 Drawing Sheets

(51) Int. Cl.
*H04W 72/04* (2009.01)
*H04W 16/28* (2009.01)

(56) References Cited

OTHER PUBLICATIONS

TSG: TS 38.321, Version 2.0.0 RP-172419, Dec. 2017, Presentation of Specification/Report to TSG: RP-172419.*
"Discussion on the beam failure recovery impact on RAN2," 3GPP TSG-RAN WG2 Meeting #100; Dec. 1, 2017; 13 pages.
"Medium Access Control (MAC) protocol specification," (Release 15) 3rd Generation Partnership Project; Technical Specification Group Radio Access Network, Dec. 2017; 4 pages.
"LS to RAN2 on Beam Failure Recovery," 3GPP TSG RAN WG1 Meeting #91; Jan. 26, 2018; 3 pages.
SIPO First Office Action corresponding to Application No. 201810024551.X; dated Sep. 20, 2019.
Kazuaki Takeda; "New Radio (NR) Access Technology," 3GPP TSG RAN meeting #76; RP-171505, Jun. 8, 2017; 218 pages.
Presentation of Specification/Report to TSG: TS 38.321, Version 2.0.0; RAN WG2; RP-172419, Dec. 11, 2017, 56 pages.
International Search Report for corresponding Application PCT/CN2018/124138; dated Mar. 15, 2019.

* cited by examiner

METHOD FOR REPORTING BEAM RECEPTION FAILURE, USER EQUIPMENT, MEDIUM AND SYSTEM

CROSS-REFERENCE TO RELATED APPLICATIONS

This application is the national phase of International Application No. PCT/CN2018/124138, filed on Dec. 27, 2018, which claims the benefit of priority to Chinese Patent Application No. 201810024551.X, filed on Jan. 10, 2018, the entire contents of this application are hereby incorporated herein by reference.

TECHNICAL FIELD

The present disclosure relates to a telecommunication field, and more particularly, to a method for reporting a beam reception failure, a user equipment and a system.

BACKGROUND

In a 5-th generation (5G) New Radio (NR) system, a cell may be composed of a plurality of beams. When a cell includes a plurality of beams, each beam broadcasts its corresponding synchronization signal block (SS BLOCK), and the synchronization signal block carries a synchronization signal block index (SS BLOCK INDEX). A user equipment (UE) performs downlink synchronization by receiving synchronization signal blocks, and synchronization signal blocks corresponding to different beams carry different synchronization signal block indexes. When the UE moves in the cell, a beam switching is performed in accordance with a measurement of the synchronization signal block.

For a carrier aggregation, a base station (gNB) may configure a primary cell (PCell) and a secondary cell (SCell) for the UE. For the PCell, the base station configures a dedicated preamble for the UE. Accordingly, if a beam reception fails, the UE can transmit the dedicated preamble to notify the base station of the reception failure using an uplink resource corresponding to a candidate beam, and after receiving the preamble, the base station responds to the UE using the candidate beam.

For the SCell without a Physical Random Access Channel (PRACH), the dedicated preamble cannot be configured for the UE to notify the base station of the beam reception failure. Therefore, when the beam fails, the UE cannot notify the base station in time, which may cause a call drop and the communication cannot be recovered in time in the SCell, thereby affecting the service quality of the UE. However, if a solution similar to the PCell is applied, each SCell needs to be configured with the PRACH. If there is a large quantity of SCells, more reservation of radio resources for PRACH can be caused and the network deployment may be affected. And if the beam reception failures are also reported by a measurement report of the PCell, an overhead of the Physical Uplink Control Channel (PUCCH) of the PCell may be increased, which may result in more reservation of radio resources for PUCCH.

SUMMARY

Embodiments of the present disclosure provide a method for reporting beam reception failure including: obtaining an identifier of a secondary cell where a beam reception fails; selecting one beam other than the beam which is failed as a candidate beam in the secondary cell where the beam reception fails; and encapsulating the identifier of the secondary cell where the beam reception fails and an identifier of the candidate beam into a Media Access Control Control Element (MAC CE), and transmitting the MAC control element out using resource of one cell other than the secondary cell where the beam reception fails, wherein the cell other than the secondary cell where the beam reception fails includes: a primary cell, a primary secondary cell, or other secondary cells where no beam reception fails.

In some embodiments, the identifier of the candidate beam includes a synchronization signal block index corresponding to the candidate beam.

In some embodiments, for each secondary cell where the beam reception fails, the corresponding MAC control element includes a body of at least 2 bytes, wherein one byte is configured to represent the identifier of the secondary cell where the beam reception fails, and the other byte is configured to represent the identifier of the candidate beam.

In some embodiments, the secondary cell only configures a downlink carrier, or configures both the downlink carrier and an uplink carrier.

In some embodiments, selecting one beam other than the beam which is failed as a candidate beam includes: selecting one beam other than the beam which is failed which has the highest received signal strength as the candidate beam.

Embodiments of the present disclosure provide a method for reporting beam reception failure including: receiving a Radio Resource Control (RRC) signaling, wherein the RRC signaling may include: a dedicated preamble parameter for reporting the beam reception failure; determining a way to report the beam reception failure; and when the beam reception fails, in accordance with the determined way for reporting the beam reception failure, reporting the beam reception failure via the MAC CE, or reporting the beam reception failure using the dedicated preamble.

In some embodiments, the RRC signaling further includes: a parameter for the method to determine the way to report the beam reception failure; wherein the determining a way for reporting the beam reception failure includes: the method to determine the way for reporting the beam reception failure, in accordance with the parameter for reporting beam reception failure.

Embodiments of the present disclosure provide a user equipment including: an obtaining circuitry, configured to obtain an identifier of a secondary cell where a beam reception fails; a selecting circuitry, configured to select one beam other than the beam which is failed as a candidate beam in the secondary cell where the beam reception fails; and a first reporting circuitry, configured to encapsulate the identifier of the secondary cell where the beam reception fails and an identifier of the candidate beam into a Media Access Control (MAC) control element, and transmitting the MAC control element out using resource of one cell other than the secondary cell where the beam reception fails, wherein the cell other than the secondary cell where the beam reception fails includes: a primary cell, a primary secondary cell, or other secondary cells where no beam reception fails.

In some embodiments, the identifier of the candidate beam includes a synchronization signal block index corresponding to the candidate beam.

In some embodiments, for each secondary cell where the beam reception fails, the corresponding MAC control element includes a body of at least 2 bytes, wherein one byte is configured to represent the identifier of the secondary cell where the beam reception fails, and the other byte is configured to represent the identifier of the candidate beam.

In some embodiments, the secondary cell only configures a downlink carrier, or configures both the downlink carrier and an uplink carrier.

In some embodiments, selecting a beam other than the beam which is failed as a candidate beam includes: selecting one beam other than the beam which is failed which has the highest received signal strength as the candidate beam.

Embodiments of the present disclosure provide a user equipment including: a receiving circuitry, configured to receive an RRC signaling, wherein the RRC signaling may include: a dedicated preamble parameter for reporting the beam reception failure; determining a way to report the beam reception failure; and when the beam reception fails, in accordance with the determined way for reporting the beam reception failure, reporting the beam reception failure via the MAC CE, or reporting the beam reception failure using the dedicated preamble.

In some embodiments, the RRC signaling further includes: a parameter for the method to determine the way to report the beam reception failure; wherein the determining a way for reporting the beam reception failure includes: the method to determine the way for reporting the beam reception failure, in accordance with the parameter for reporting beam reception failure.

Embodiments of the present disclosure provide a computer-readable storage medium, storing computer instructions, wherein once the computer instructions are executed, the mentioned-above method is performed.

Embodiments of the present disclosure provide a system, including a memory and a processor, wherein the memory stores computer instructions executable on the processor, and the processor executes wherein once the computer instructions are executed, the mentioned-above method when executing the computer instructions Embodiments of the present disclosure have the following benefits.

In embodiments of the present disclosure, the identifier of the secondary cell where the beam reception fails and the identifier of the corresponding candidate beam are encapsulated into the MAC control element, and the MAC control element is transmitted out using resource of other cells. Since the MAC control element is used, the PRACH and the dedicated preamble are not required to be configured, and the PUCCH is not used. Therefore, the identifier of the secondary cell where the beam reception fails and its corresponding candidate beam could be transmitted without using the PRACH and the PUCCH.

Further, selecting one beam other than the beam which is failed with the highest received signal strength as the candidate beam may improve the success rate of subsequent beam reception.

DETAILED DESCRIPTION

For a SCell, when a PRACH is not configured, a dedicated preamble cannot be configured for a UE to notify a base station of a beam reception failure. Therefore, when the beam fails, the UE cannot notify the base station in time, which may cause the communication to be drop thereby affecting the quality of services of the UE. If a method similar to an implementation of a PCell is used, the PRACH needs to be configured for each SCell. When the number of SCells is large, radio resources for the PRACH resources are to be reserved and the network deployment is affected. If the beam reception failure is reported by a measurement report of the PCell, an overhead of the PUCCH of the PCell is increased, resulting in more reservation of radio resources for the PUCCH.

In embodiments of the present disclosure, an identifier of the secondary cell where the beam reception fails and an identifier of the corresponding candidate beam are encapsulated into the MAC control element, and the MAC control element is transmitted out using resource of other cells. Since the MAC control element is used, the PRACH and the dedicated preamble are not required to be configured, and the PUCCH is not used. Therefore, the identifier of the secondary cell where the beam reception fails and its corresponding candidate beam could be transmitted without using the PRACH and the PUCCH.

In order that the above objects, characteristics and advantages of the present disclosure become more apparent, and embodiments of the present disclosure are described in detail with reference to the drawings.

Figure 1:
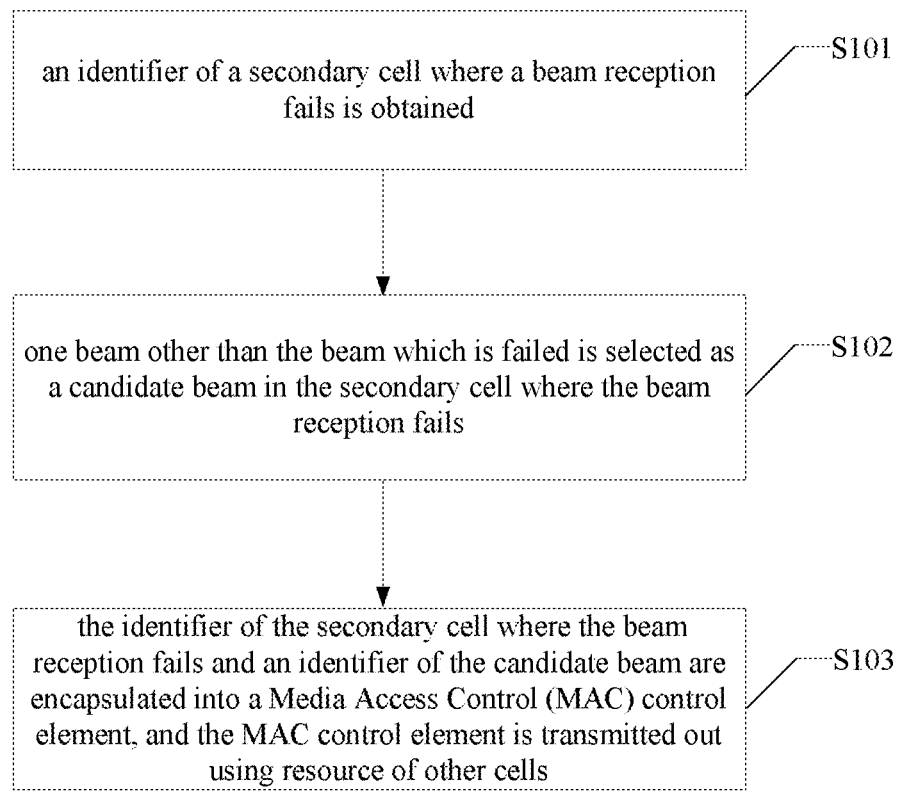
FIG. 1 schematically illustrates a flow diagram of a method for reporting a beam reception failure according to an embodiment of the present disclosure.

Referring to FIG. 1, FIG. 1 schematically illustrates a flow diagram of a method for reporting a beam reception failure according to an embodiment of the present disclosure, wherein the method may include following steps.

In S101, an identifier of a secondary cell where a beam reception fails is obtained.

In some embodiments, existing methods may be applied for determining the beam reception failure. For example, when the user equipment continuously detects that signal quality of a current serving beam is lower than a predetermined threshold of the beam reception failure, the beam reception failure is determined. Related parameters like the predetermined threshold are pre-configured by the base station to the user equipment, which will be not described herein.

In S102, one beam other than the beam which is failed is selected as a candidate beam in the secondary cell where the beam reception fails.

In some embodiments, after the beam reception fails, it is required to select one beam other than the current beam which is failed as the candidate beam in a beam set corresponding to the secondary cell in which the beam reception fails. The beam set is pre-configured by the base station, and can be detected and received by the user equipment.

In some embodiments, one beam other than the beam which is failed which has the highest received signal strength is selected as the candidate beam in the secondary cell where the beam reception fails. The higher the received signal strength, the better the reception quality, and beams other than the beam which is failed with the highest received signal strength is selected as candidate beam, which improves a success rate of subsequent beam reception.

In S103, the identifier of the secondary cell where the beam reception fails and an identifier of the candidate beam are encapsulated into a Media Access Control (MAC) control element, and the MAC control element is transmitted out using resource of other cells, wherein the other cells include: a primary cell, a primary secondary cell, or other secondary cells where the beam reception fails.

In some embodiments, in order not to save radio resources of the PRACH and the PUCCH, the identifier of the secondary cell where the beam reception fails and the identifier of the candidate beam may be encapsulated into the MAC control element, and the MAC control element may be transmitted out by a Physical Uplink Shared Channel (PUSCH) of other cells where no beam receptions fails.

In some embodiments, for a carrier aggregation of a single-connect scenario, the base station may configure the PCell and the S Cell for the user equipment; for a carrier aggregation of a dual-connect (DC) scenario, the base station may configure a Master Cell Group, MCG) and a Secondary Cell Group (SCG) for the user equipment. The primary serving cell in the MCG is the PCell, the primary serving cell in the SCG is the Primary Secondary Cell (PSCell), and the PCell and PSCell are collectively referred to as a special cell (SpCell).

In some embodiments, the identifier of the secondary cell where the beam reception fails and the identifier of the candidate beam may be encapsulated into the MAC control element, and the MAC control element may be transmitted out through the PUSCH of a PCell in the MCG, a PSCell in the SCG, or other secondary cells where the beam reception does not fail.

In some embodiments, for each secondary cell where the beam reception fails, the corresponding MAC control element includes: a body of at least 2 bytes, wherein one byte is configured to represent the identifier of the secondary cell, and the other byte is configured to represent the identifier of the candidate beam.

In some embodiments, when a cell includes a plurality of beams, each beam broadcasts its corresponding synchronization signal block, and the synchronization signal block carries a synchronization signal block index, therefore, the synchronization signal block index may be configured to identify the candidate beam.

In some embodiment, the identifier of the candidate beam includes a synchronization signal block index corresponding to the candidate beam.

Figure 2:
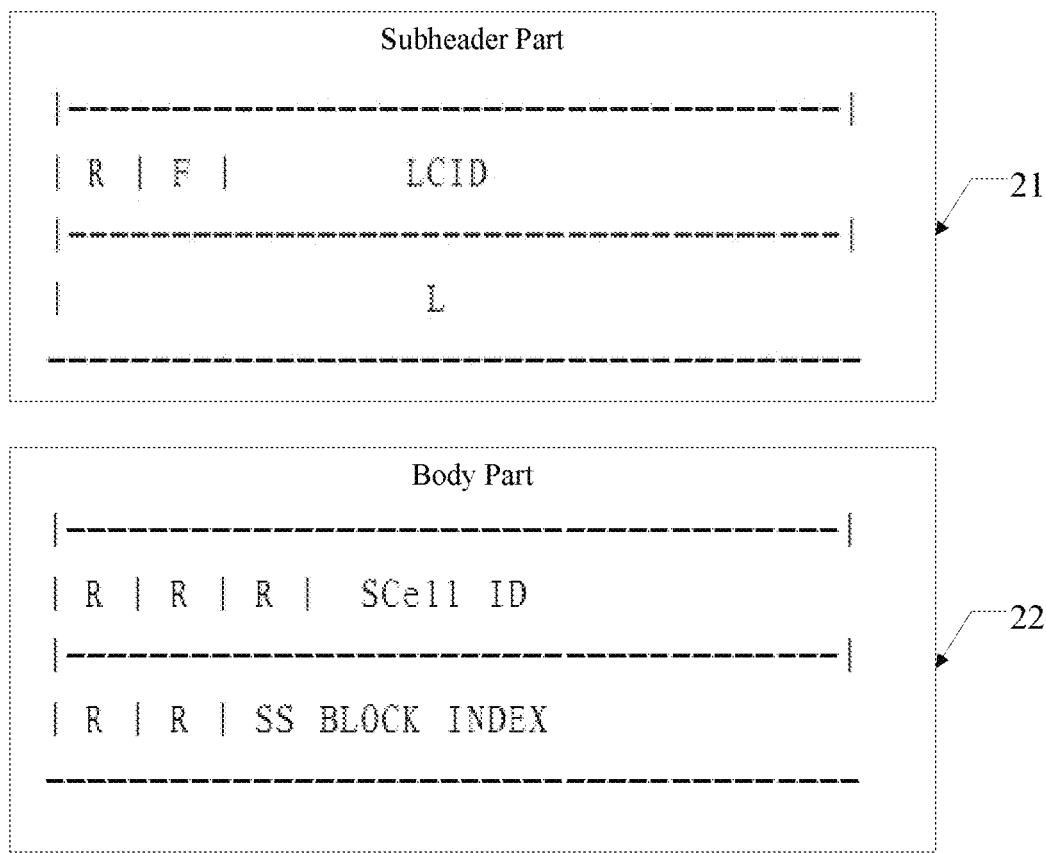
FIG. 2 schematically illustrates a structure diagram of a MAC control element according to an embodiment of the present disclosure.

For those skilled in the art to better understand and implement embodiments of the present disclosure, embodiments of the present disclosure schematically illustrates a block diagram of a MAC control element, as shown in FIG. 2.

Referring to FIG. 2, the MAC control element includes a subheader part 21 and a body part 22.

The subheader part uses existing implementation schemes, including an R field, an F field, an LCID field and an L field, wherein the R field includes 1 bit, which is a reserved bit; the F field includes 1 bit, which is a flag bit; the LCID field includes 6 bits, which is a Logical Channel Identity (LCID) or a type of control element; and the L field includes 8 bits, which is a length of the body part.

The body part includes 5 R field, a SCell ID field, and a SS BLOCK INDEX field, where the R field s are reserved bits, and the SCell ID field s include 5 bits, which is the identifier of the secondary cell where the beam reception fails; and the SS BLOCK INDEX field includes 6 bits, which is the synchronization signal block index corresponding to the candidate beam.

In some embodiments, based on the current implementation scheme, the LCID field ranging from 100001 to 110111 corresponds to the reserved bit. Any one of 100001 to 110111 may be selected for identifying the SCell ID field and the SS BLOCK INDEX field, that is, setting LCID field to any one of 100001 to 110111 to indicate the SCell ID field and the SS BLOCK INDEX field in the body part.

In some embodiments, the MAC control element may include one identifier of the secondary cell where the beam reception fails and one corresponding identifier of the candidate beam, and may also include a plurality of identifiers of the secondary cells where the beam reception fails and their corresponding identifiers of candidate beam. When the MAC control elements includes a plurality of identifiers of the secondary cells where the beam reception fails and their corresponding identifiers of the candidate beam, the body part includes: an identifier of a secondary cell 1 where the beam reception fails and a corresponding identifier of the candidate beam, an identifier of a secondary cell 2 where the beam reception fails and a corresponding identifier of the candidate beam, until an identifier of the last secondary cell where the beam reception fails and a corresponding identifier of the candidate beam.

In one embodiment, the R field is 0, the F field is 0, and the LCID field is 110110.

In some embodiments, the secondary cell may only configure a downlink carrier, and may also configure both the downlink carrier and an uplink carrier.

In some embodiments, the base station may configure the PRACH for the SCell. In this case, a dedicated preamble parameter for reporting the beam reception failure may be configured. When the base station configures the dedicated preamble parameter for the SCell for reporting the beam reception failure and the beam reception fails, a way for reporting the beam reception failure is first determined, and then the beam reception failure is transmitted based on the determined way of reporting the beam reception failure.

Figure 3:
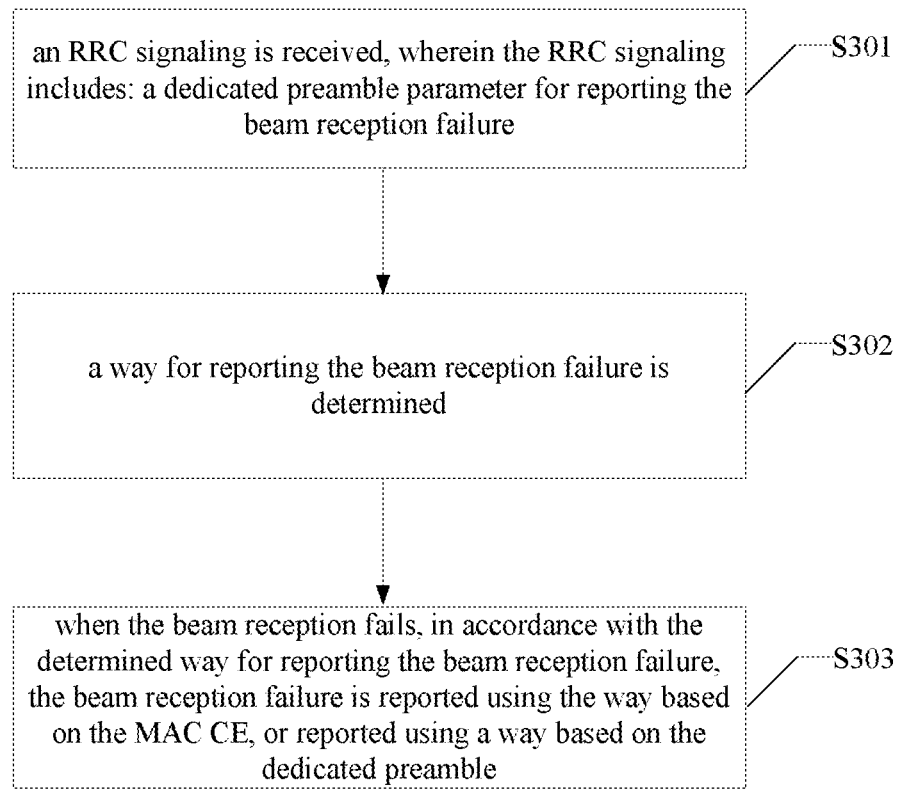
FIG. 3 schematically illustrates a flow diagram of a method for reporting the beam reception failure according to an embodiment of the present disclosure.

For those skilled in the art to better understand and implement embodiments of the present disclosure, embodiments of the present disclosure schematically illustrates a flow diagram of a method for reporting beam reception failure, as shown in FIG. 3.

Referring to FIG. 3, the method for reporting beam reception failure may include following steps.

In S301, a Radio Resource Control (RRC) signaling is received, wherein the RRC signaling includes: a dedicated preamble parameter for reporting the beam reception failure.

In S302, a way for reporting the beam reception failure is determined.

In some embodiments, the base station may configure a PRACH for the SCell. In this case, and a dedicated preamble parameter for reporting the beam reception failure may be further configured. When the base station configures the dedicated preamble parameter for the SCell for reporting the beam reception failure and the beam reception fails, a way for reporting the beam reception failure is first determined.

In some embodiment, the user equipment determines the way for reporting the beam reception failure by itself.

In some embodiments, when the base station configures the dedicated preamble for reporting the beam reception failure for the SCell, the specific way for reporting the beam reception failure may be configured, that is, reporting the beam reception failure based on the MAC control element or based on the dedicated preamble.

In some embodiment, the RRC signaling may further include: a parameter for the method to determine the way to report the beam reception failure; when the beam reception fails, the user equipment determines the way for reporting the beam reception failure in accordance with the parameter for reporting the beam reception failure.

S303, when the beam reception fails, in accordance with the determined way for reporting the beam reception failure, the beam reception failure is reported using the way based on the MAC control element, or reported using a way based on the dedicated preamble.

In some embodiments, when the way for reporting beam reception failure is based on the MAC control element, in accordance with the method for reporting the beam reception failure in embodiments shown in FIG. 1, the identifier of a secondary cell where the beam reception fails and the corresponding identifier of the candidate beam to the base station; when the way for reporting beam reception failure is based on the dedicated preamble, the existing scheme is used to report the beam reception failure based on the dedicated preamble (i.e., the beam failure recovery request) to the base station, which are not described herein again.

In some embodiment, the base station configures 3 downlink carriers and 3 uplink carriers for the user equipment. For the primary cell, the base station pre-configures, for the user equipment, a reference signal for detecting beam reception failure, such as a Channel state information-Reference signal (CSI-RS) or a synchronization signal block, and a predetermined threshold for the beam reception failure, and a dedicated preamble of the beam failure recovery request.

During a service, when the beam reception fails in the primary cell, the user equipment transmits a beam failure recovery request out through the dedicated preamble. After receiving the beam failure recovery request, the base station identifies the user equipment and transmits a beam recovery response to the user equipment in a corresponding Control Resource Set (CORESET).

During the service, when the beam reception fails in the secondary cell, the user equipment encapsulates the identifier of secondary cell where the beam reception fails and the identifier of the candidate beam into the MAC control element, and the MAC control element is transmitted out to the base station using resource of the primary cell or other cells where the beam reception does not fail. After receiving the MAC layer control factor, the base station recovers the communication with the user equipment according to a predetermined recovery procedure, that is, the user equipment is scheduled on the uplink or on the downlink, and the user equipment accepts the schedule.

In some embodiments, for a certain secondary cell, if the base station pre-configures the PRACH and the dedicated preamble of the beam failure recovery request, when the beam reception fails in the secondary cell, the user equipment may report the beam reception failure by the dedicated preamble (e.g., send the beam failure recovery request), or report the beam reception failure by the MAC control element.

In some embodiment of the present disclosure, the base station configures 2 downlink carriers and 1 uplink carrier for the user equipment: a Downlink (DL) PCell, an Uplink (UL) PCell, and a DL SCell.

For the DL SCell, when the beam reception fails, any foregoing methods may be used to report the identifier of the secondary cell where the beam reception fails and the corresponding identifier of the candidate beam or to report the beam failure recovery request to the base station, which is not describe herein.

In the foregoing method, the identifier of the secondary cell where the beam reception fails and the identifier of the corresponding candidate beam are encapsulated into the MAC control element, and the MAC control element is transmitted out using resource of other cells. Since the MAC control element is used, the PRACH and the dedicated preamble are not required to be configured, and the PUCCH is not used. Therefore, the identifier of the secondary cell where the beam reception fails and its corresponding candidate beam could be transmitted without using the PRACH and the PUCCH.

Figure 4:
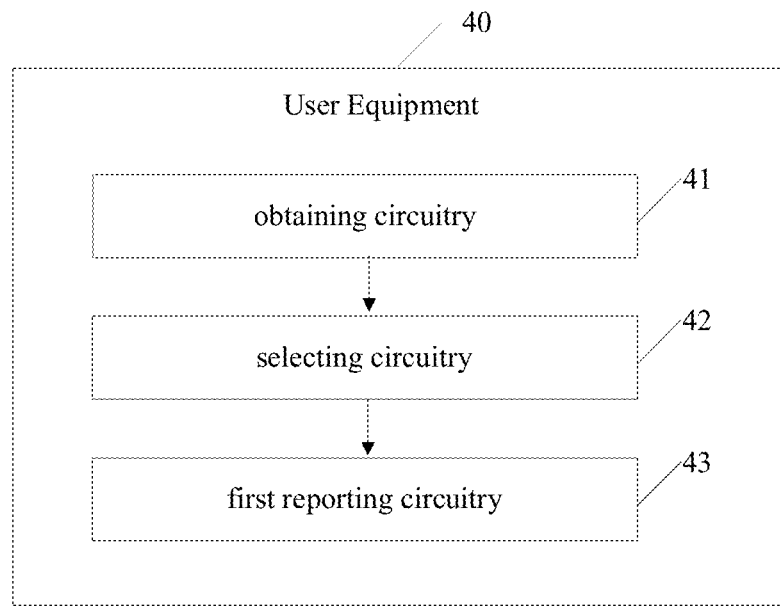
FIG. 4 schematically illustrates a structure diagram of a user equipment according to an embodiment of the present disclosure.

For those skilled in the art to better understand and implement embodiments of the present disclosure, embodiments of the present disclosure schematically illustrates a structure diagram of a user equipment for reporting the beam reception failure, as shown in FIG. 4.

Referring to FIG. 4, the user equipment 40 includes: an obtaining circuitry 41, a selecting circuitry 42 and a first reporting circuitry 43.

The obtaining circuitry 41 is configured to obtain an identifier of a secondary cell where a beam reception fails.

The selecting circuitry 42 is configured to select one beam other than the beam which is failed as a candidate beam in the secondary cell where the beam reception fails.

The first reporting circuitry 43 is configured to encapsulate an identifier of a secondary cell where the beam reception fails and an identifier of the candidate beam as a MAC control element, and transmitting the MAC control element out using resource of one cell other than the secondary cell where the beam reception fails, wherein the cell other than the secondary cell where the beam reception fails includes: a primary cell, a primary secondary cell, or other secondary cells where the beam reception fails.

In some embodiment, the identifier of the candidate beam includes a synchronization signal block index corresponding to the candidate beam.

In some embodiments, for each secondary cell where the beam reception fails, the corresponding MAC control element includes: a body of at least 2 bytes, wherein one byte is configured to represent the identifier of the secondary cell, and the other byte is configured to represent the identifier of the candidate beam.

In some embodiment, the secondary cell only configures a downlink carrier, or configures both the downlink carrier and an uplink carrier In some embodiment, the selecting circuitry 42 is configured to select one of the other beams with the highest received signal strength as the candidate beam.

In some embodiments, more details about principles and manners of the user equipment 40 may refer to the forgoing method in embodiments, which are not described in detail here.

Figure 5:
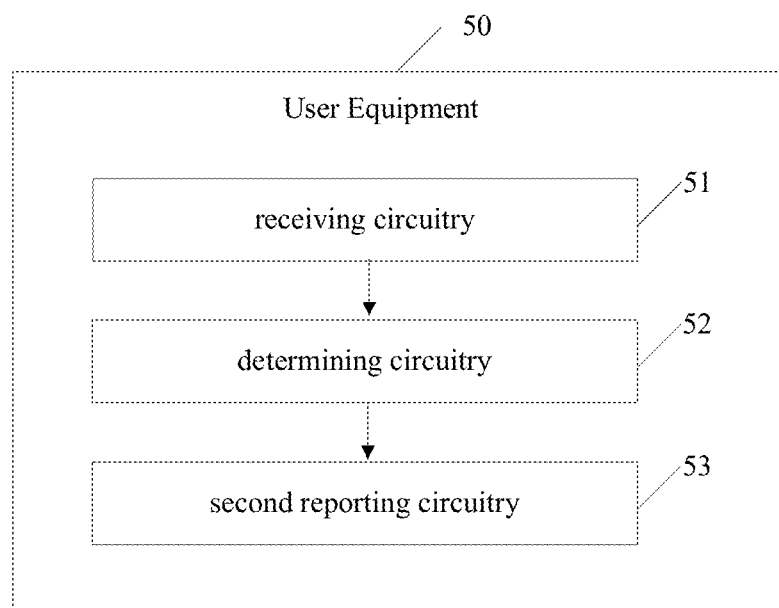
FIG. 5 schematically illustrates a structure diagram of a user equipment according to an embodiment of the present disclosure.

For those skilled in the art to better understand and implement embodiments of the present disclosure, embodiments of the present disclosure schematically illustrate a structure diagram of a user equipment for reporting the beam reception failure, as shown in FIG. 5.

Referring to FIG. 5, the user equipment may include: a receiving circuitry 51, a determining circuitry 52 and a second reporting circuitry 53.

The receiving circuitry 51 is configured to receive an RRC signaling transmitted from the base station, wherein the RRC signaling includes: a dedicated preamble parameter for reporting the beam reception failure.

The determining circuitry 52 is configured to determine a way for reporting the beam reception failure.

When the beam reception fails, in accordance with the determined way for reporting the beam reception failure, the reporting circuitry 53 reports the beam reception failure using the way based on the MAC control element, or reported using a way based on the dedicated preamble.

In some embodiments, the RRC signaling further includes: a parameter for the method to determine the way to report the beam reception failure; wherein the determining circuitry 52 is configured to determine the way for reporting the beam reception failure, in accordance with the parameter for reporting beam reception failure.

In some embodiments, more details about principles and manners of the user equipment 50 may refer to the forgoing method in embodiments, which are not described in detail here.

Embodiments of the present disclosure provide a computer readable medium, storing computer instructions, wherein the computer readable medium includes: a non-volatile storage medium or a non-transitory storage medium. Once the computer instructions are executed, and the method for reporting the beam reception failure shown in FIG. 1 and FIG. 3 is performed.

Embodiments of the present disclosure provide a system, including a memory and a processor, wherein the memory stores computer instructions executable on the processor, and the processor executes the method for reporting the beam reception failure shown in FIG. 1 and FIG. 3 when executing the computer instructions.

Those skilled in the art may understand that all or part of steps of above methods may be completed by relevant hardware once the program instruction are executed, and the program may be storage in a computer readable storage medium, such as a Read-Only memory (ROM), a Random Access Memory (RAM), a magnetic disk or an optical disk.

Although the present disclosure has been disclosed above with reference to preferred embodiments thereof, it should be understood that the disclosure is presented by way of example only, and not limitation. Those skilled in the art may modify and vary the embodiments without departing from the spirit and scope of the present disclosure.

What is claimed is:

1. A method for reporting beam reception failure comprising:
    obtaining an identifier of a secondary cell where a beam reception fails;
    selecting one beam other than the beam which is failed as a candidate beam in the secondary cell where the beam reception fails; and
    encapsulating the identifier of the secondary cell where the beam reception fails and an identifier of the candidate beam into a Media Access Control (MAC) control element, and transmitting the MAC control element out using resource of one cell other than the secondary cell where the beam reception fails, wherein the cell other than the secondary cell where the beam reception fails comprises: a primary cell, a primary secondary cell, or other secondary cells where no beam reception fails.

2. The method according to claim 1, wherein the identifier of the candidate beam comprises a synchronization signal block index corresponding to the candidate beam.

3. The method according to claim 1, wherein for each secondary cell where the beam reception fails, the corresponding MAC control element comprises a body of at least 2 bytes, wherein one byte is configured to represent the identifier of the secondary cell where the beam reception fails, and the other byte is configured to represent the identifier of the candidate beam.

4. The method according to claim 1, wherein the secondary cell only configures a downlink carrier, or configures both the downlink carrier and an uplink carrier.

5. The method according to claim 1, wherein the selecting one beam other than the beam which is failed as a candidate beam comprises: selecting one beam other than the beam which is failed which has the highest received signal strength as the candidate beam.

6. A user equipment comprising:
    an obtaining circuitry, configured to obtain an identifier of a secondary cell where a beam reception fails;
    a selecting circuitry, configured to select one beam other than the beam which is failed as a candidate beam in the secondary cell where the beam reception fails; and
    a first reporting circuitry, configured to encapsulate the identifier of the secondary cell where the beam reception fails and an identifier of the candidate beam into a Media Access Control (MAC) control element, and transmitting the MAC control element out using resource of one cell other than the secondary cell where the beam reception fails, wherein the cell other than the secondary cell where the beam reception fails comprises: a primary cell, a primary secondary cell, or other secondary cells where no beam reception fails.

7. The user equipment according to claim 6, wherein the identifier of the candidate beam comprises a synchronization signal block index corresponding to the candidate beam.

8. The user equipment according to claim 6, wherein for each secondary cell where the beam reception fails, the corresponding MAC control element comprises a body of at least 2 bytes, wherein one byte is configured to represent the identifier of the secondary cell where the beam reception fails, and the other byte is configured to represent the identifier of the candidate beam.

9. The user equipment according to claim 6, wherein the secondary cell only configures a downlink carrier, or configures both the downlink carrier and an uplink carrier.

10. The user equipment according to claim 6, wherein the selecting a beam other than the beam which is failed as a candidate beam comprises: selecting one beam other than the beam which is failed which has the highest received signal strength as the candidate beam.

* * * * *